United States Patent
MacColl

(10) Patent No.: US 6,393,638 B1
(45) Date of Patent: May 28, 2002

(54) WATERPROOF BLANKET WITH INTEGRATED STORAGE BAG

(76) Inventor: Ian Coats MacColl, 499 Marina Blvd., #106, San Francisco, CA (US) 94123

( * ) Notice: Subject to any disclaimer, the term of this patent is extended or adjusted under 35 U.S.C. 154(b) by 0 days.

(21) Appl. No.: 09/553,700

(22) Filed: Apr. 20, 2000

Related U.S. Application Data

(60) Provisional application No. 60/130,110, filed on Apr. 19, 1999.

(51) Int. Cl.[7] .................................................. A47G 9/06
(52) U.S. Cl. ..................................... 5/419; 5/417; 383/4
(58) Field of Search ........................... 5/417, 419, 485, 5/420; 383/4

(56) References Cited

U.S. PATENT DOCUMENTS

| | | | |
|---|---|---|---|
| 4,278,719 A | | 7/1981 | Sarnecki |
| 4,375,111 A | * | 3/1983 | Hall ................................ 5/419 |
| 4,703,528 A | * | 11/1987 | Rolle ............................. 5/417 |
| 5,427,834 A | * | 6/1995 | Sodetz ........................... 5/417 |
| 5,481,767 A | | 1/1996 | Lewis |
| 5,774,912 A | * | 7/1998 | Dominique .................... 5/419 |
| 6,023,797 A | | 2/2000 | Brumfield |
| 6,223,367 B1 | * | 5/2001 | French et al. .................. 5/419 |

* cited by examiner

Primary Examiner—Michael F. Trettel

(74) Attorney, Agent, or Firm—Vierra Magen Marcus Harmon & DeNiro LLP

(57) ABSTRACT

A blanket is disclosed including a soft woven fabric with a waterproof backing layer which can be folded, rolled and/or stuffed into an attached water-resistant storage bag. In accordance with the preferred embodiment, the blanket can be constructed of two rectangular layers: the first a soft woven natural or synthetic textile and, the second, a waterproof or water-resistant woven natural or synthetic textile. The two layers are joined by means of sewing or heat welding along the edges and several linear seams or heat welds along the longitudinal and/or transverse axis to indicate suggested folding patterns and to keep the layers co-planar when cleaned in a washing machine/dryer or by other methods. The edges of the blanket are finished by means of a seam, such as a French seam, or an additional binding element of similar material to the waterproof layer. The edges of the blanket are radiused to allow for the easy manufacture should a binding element be employed. Attached by means of a fabric strip along an edge perpendicular to the longitudinal folding seams is a reversible bag with a closure mechanism such that when the blanket is folded or rolled it can be stored securely within. The storage bag and closure mechanism capture the folded, rolled or stuffed blanket within and form a barrier between the blanket and any adjacent outside surface. The bag may be reversible such that the bag is inverted around the blanket to store the blanket therein. Alternatively, the bag may not be reversible. Moreover, the bag may be used as a pillow when the blanket is stored therein or when the blanket is unfolded.

29 Claims, 5 Drawing Sheets

WATERPROOF BLANKET WITH INTEGRATED STORAGE BAG

CLAIM OF PRIORITY

This application claims the benefit of U.S. Provisional Application No. 60/130,110 filed Apr. 20, 1999.

BACKGROUND OF THE INVENTION

1. Field of the Invention

The present invention generally relates to a waterproof blanket which is water resistant on one side, a soft woven fabric on the other, and generally stores into an attached storage bag.

1. Description of the Related Art

Soft woven fabrics with waterproof backings are known. During recreational activities generally outside the home, people desire the benefit of a soft fabric blanket during certain situations and a durable waterproof tarpaulin during other situations. These might include protecting the car interior from dirty items (such as pets, firewood, or soiled sports equipment) or protecting individuals from the elements (such as sitting on a wet ground or working under a car). In general, the uses for a combination blanket and tarpaulin are temporary and tangible benefit is derived from a means of capturing and storing the folded blanket/tarpaulin in a bag when not in use. There is an added measure of convenience if the storage bag is attached and can not be lost. People generally do not fold blankets exactly as designed and a need exists for intended storage with imperfect folding methods. In addition, as the device will become dirty as a result of its use, the materials and construction should be machine-washable. Therefore, a need exists for a machine-washable blanket tarpaulin combination which is stored conveniently in an attached fabric bag.

A number of inventions have been patented for a blanket with waterproof backing. U.S. Pat. No. 5,427,834 to Sodetz issued Jun. 27, 1995 describes a waterproof textile with a transparent case. U.S. Pat. No. 5,740,566 to Stacy issued Apr. 21, 1998 describes a combination tarpaulin-blanket construction with securing straps and a handle for carrying. U.S. Pat. No. 4,278,719 to Sarnecki issued Jul. 14, 1981 describes a towel construction including a cover sheet of terrycloth and a backing sheet of waterproof nylon. A number of inventions have also been patented for reversible bags. U.S. Pat. No. 4,085,873 to Schweitzer issued Apr. 25, 1978 describes a lightweight cloth knapsack with a sewn in pocket that reverses to store the device when not in use. U.S. Pat. No. 5,608,916 to Aumann issued Mar. 11, 1997 describes a waterproof coat with a reversible pocket to store the coat when not being worn.

SUMMARY OF THE INVENTION

The present invention is a soft woven fabric with a waterproof backing layer which can be folded, rolled and/or stuffed into an attached water-resistant storage bag. In accordance with the preferred embodiment, the blanket can be constructed of two rectangular layers: the first a soft woven natural or synthetic textile and, the second, a waterproof or water-resistant woven natural or synthetic textile. The two layers are joined by means of sewing or heat welding along the edges and several linear seams or heat welds along the longitudinal and/or transverse axis to indicate suggested folding patterns and to keep the layers co-planar when cleaned in a washing machine/dryer or by other methods. The edges of the blanket are finished by means of a seam, such as a French seam, or an additional binding element of similar material to the waterproof layer. The edges of the blanket are radiused to allow for the easy manufacture should a binding element be employed. Attached by means of a fabric strip along an edge perpendicular to the longitudinal folding seams is a reversible bag with a closure mechanism such that when the blanket is folded, rolled and/or stuffed, it can be stored securely within. The storage bag and closure mechanism capture the folded, rolled and/or stuffed blanket within and form a barrier between the blanket and any adjacent outside surface. The closure mechanism can be a zipper, a flap with a Velcro® strip, one or more snaps, a button and hole, or any other generally accepted means of closing a bag. While some products rely on specific folding patterns, the present invention can be folded in a variety of user preferred methods and still be captured by the reversible bag. The storage bag is attached to the blanket by means of a fabric strip, whose purpose is to allow for misaligned folding methods. Transverse and longitudinal seams form a grid pattern on the product and promote both ease of folding as well as indications as to the intended size of the folds.

DETAILED DESCRIPTION OF THE INVENTION

Figure 1:
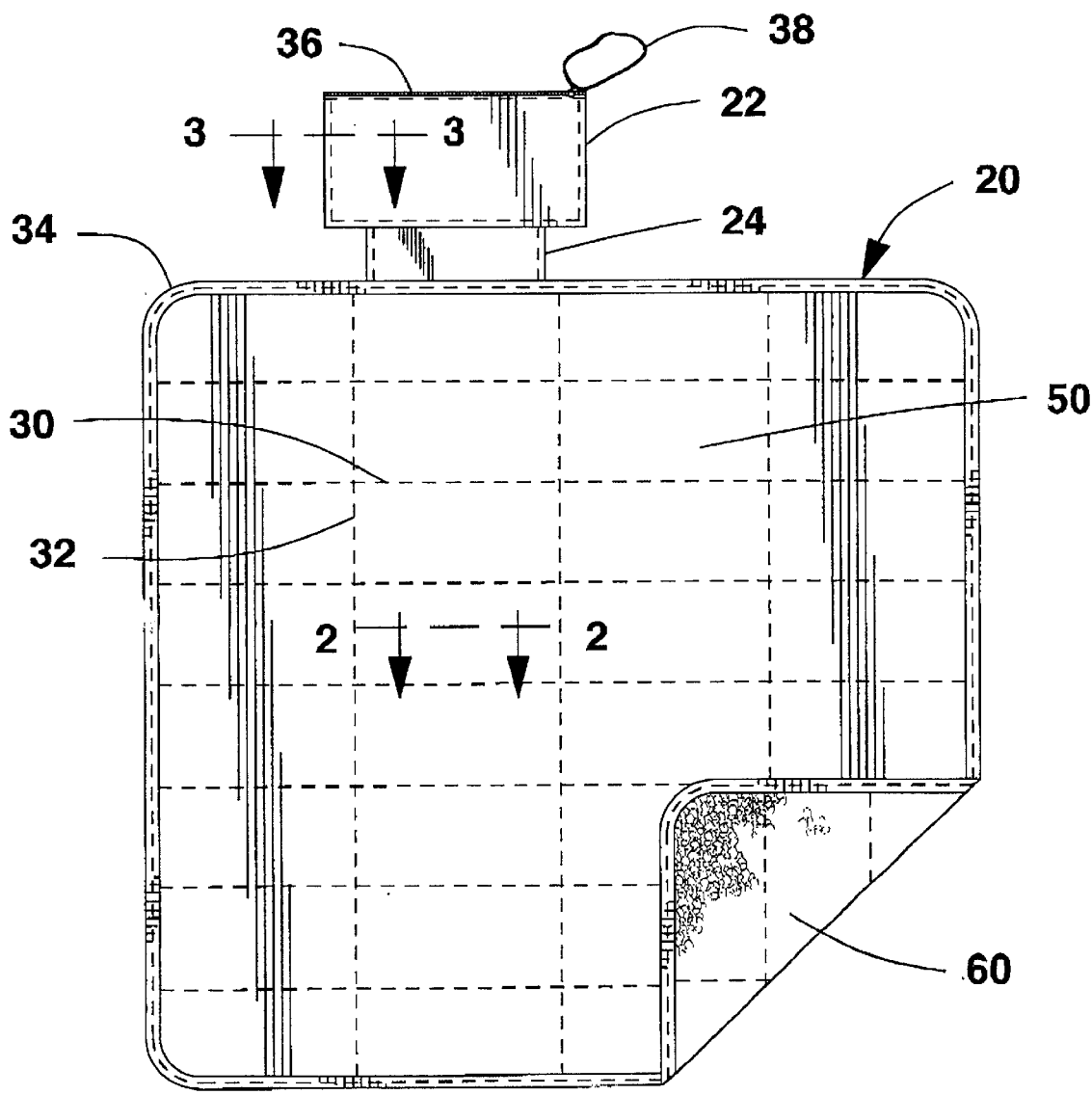
FIG. 1 is a top plan view of a blanket of the present invention in the unfolded state with a corner folded back to show the bottom of the construction.

The present invention will now be described with reference to FIGS. 1–15, which in general relate to a waterproof blanket which is water resistant on one side, a soft woven fabric on the other, which blanket stores into an attached storage bag. While this invention is susceptible of embodiment in many different forms, there is shown in the drawings, and will herein be described in detail, preferred embodiments of the invention. While a preferred embodiment of the present invention relates to a blanket, it is understood that embodiments of the present invention described hereinafter may comprise other articles including a cover and a mat. The present disclosure is to be considered as an exemplification of the principles of the invention and is not intended to limit the broad aspect of the invention to the embodiments illustrated.

Referring to FIG. 1, the blanket 20 includes a sheet of pliable machine-washable waterproof material 50 and a sheet of pliable machine-washable soft woven material 60 generally aligned along the outer edges. The material 50 may be any of various plush materials, and material 60 may be any of various waterproof materials including various elastomers and polymers. The pliable machine-washable waterproof material 50 and the pliable machine-washable soft woven material 60 may further be a single color or multiple colors in a pattern.

The blanket is stitched together by means well known in the art along seven equally spaced transverse seam/fold line 30 and four equally spaced longitudinal seam/fold line 32 or as many as generally needed to demonstrate the proper size when folded and the folding method. The preferred embodiment is generally rectangular with radiused corner 34 no less than 3 inches in diameter. The preferred embodiment is approximately 5 feet along the longitudinal axis and approximately 4 feet along the transverse axis. It is understood that the number of transverse and longitudinal seams/fold lines, as well as the dimensions of the blanket 20, may vary in alternative embodiments. Moreover, it is understood that the first and second sheets of material 50, 60 may be stitched to each other in patterns other than rectangles, such as for example diamonds and arcuate-shaped patterns. Alternatively, instead of a linear stitch pattern, the materials 50, 60 may be affixed to each other at discrete points. It is further understood that the sheets of material 50, 60 may be affixed to each other by known methods other than or in addition to stitching, such as for example by riveting and/or thermal bonding.

Figure 2:
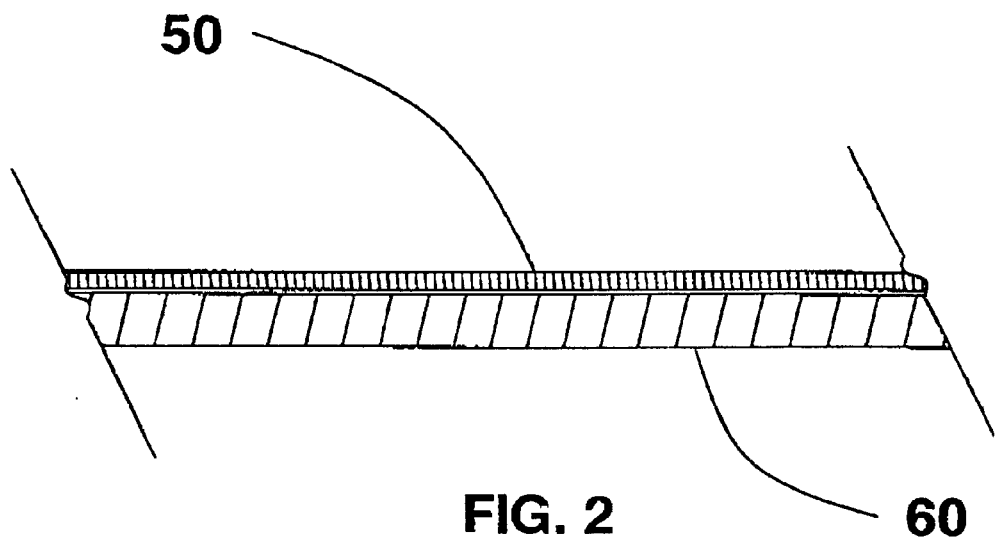
FIG. 2 is a cross sectional view along the line 2—2 of a portion of the construction of FIG. 1 showing multiple layers.

The edge around the perimeter as shown in FIG. 2 is finished with a binding element, a means well known in the art. The preferred embodiment uses a fabric connecting strip 24 which is generally 2–6 inches long. The fabric connecting strip 24 is generally used for attaching the reversible storage bag 22 to the blanket 20 and for allowing the reversible storage bag 22 to slide evenly over the folded blanket 20, even when blanket 20 is folded in a way differing from the preferred embodiment.

Figure 3:
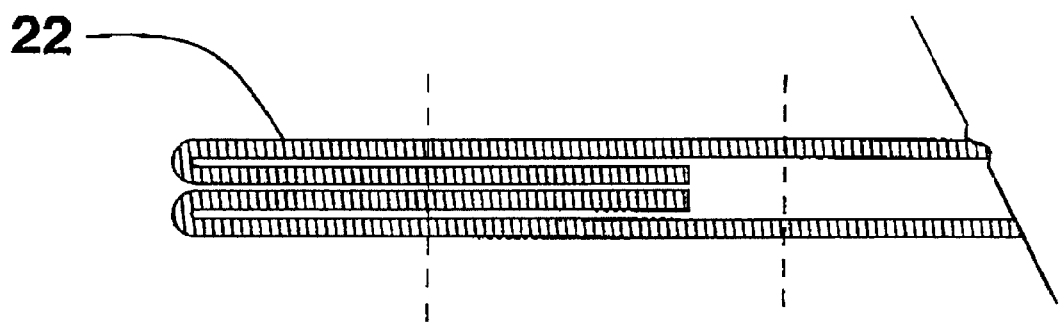
FIG. 3 is a cross-sectional view along the line 3—3 of the reversible storage bag shown in FIG. 1.

A reversible storage bag 22 is attached to the top transverse edge by means of one or more fabric connecting strips 24. The reversible storage bag 22 is wider than one quarter of the transverse dimension and taller than one-eighth of the longitudinal dimension to accommodate the blanket 20 when folded. It is understood these proportions of the bag to the blanket may vary in alternative embodiments. The reversible storage bag 22 is closed on three sides and has a closure mechanism 36 along the fourth edge with a zipper/carrying strap 38 which serves as a grip to operate the zipper and can serve as a carrying handle. As shown in FIG. 3, the seam is folded and sewn such that the edges of the reversible storage bag 22 fabric are not visible on the inside or outside of the reversible storage bag 22.

Figure 4:
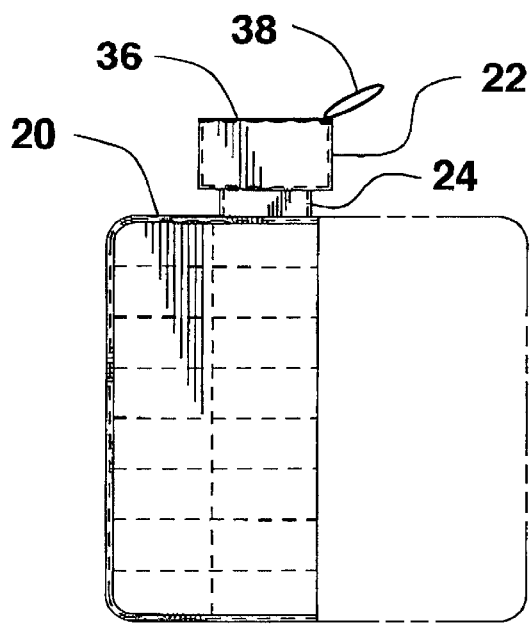
FIG. 4 is a plan view showing one half of the blanket folded over onto the other half along the center longitudinal axis.
Figure 5:
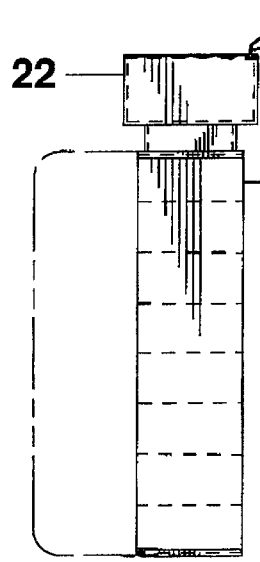
FIG. 5 is a view analogous to FIG. 4, but showing the blanket after having been folded again along the new center longitudinal axis.
Figure 6:
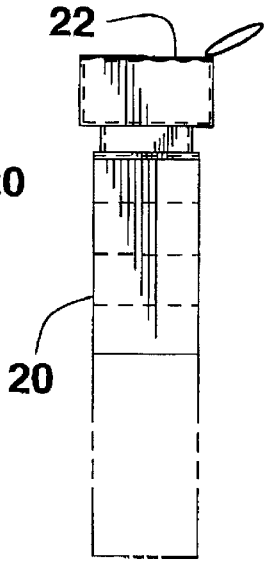
FIG. 6 is a view analogous to FIG. 5, but showing the blanket after having been folded once along the center transverse axis.
Figure 7:
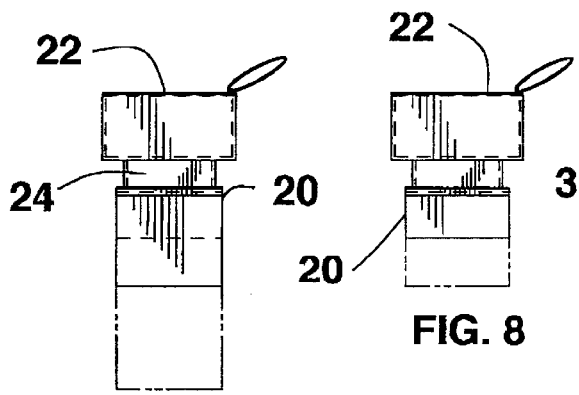
FIG. 7 is a view analogous to FIG. 6, but showing the blanket after having been folded along the new center transverse axis.
Figures 8, 9, 10:
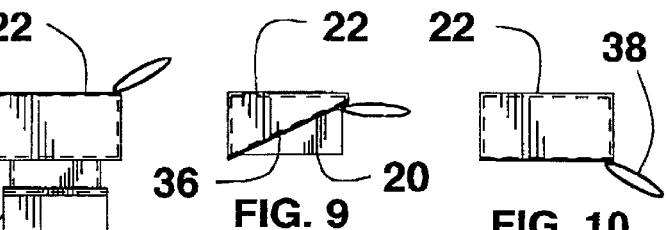
FIG. 8 is a view analogous to FIG. 7, but showing the blanket after having been folded along the new center transverse axis.
FIG. 9 is a view analogous to FIG. 8, but showing the reversible storage bag slipped halfway over the folded blanket.
FIG. 10 is a view analogous to FIG. 9, but showing the reversible storage bag slipped completely over the folded blanket with the closure mechanism open.

The blanket 20 may be formed into a compact footprint by folding, rolling and/or stuffing so as to fit within bag 22. FIGS. 4–11 show a preferred method of folding and storing the present invention. As shown in FIG. 1, the blanket is defined by approximately four longitudinal portions each approximately one-quarter the length of the transverse axis. As shown in FIG. 1, the blanket is also defined by approximately eight transverse portions each approximately one-eighth the length of the longitudinal axis. The longitudinal and transverse portions are typically defined by one or more seams along the length of the blanket, or other suitable manufacturing process for indicating division between portions and promoting folding locations. As shown in FIG. 4, the blanket 20 is folded in half along the center longitudinal seam/fold line 32. As shown in FIG. 5, the blanket 20 is folded in half again along the new center longitudinal seam/fold line 32 such that the blanket 20 is now one quarter of its original width. As shown in FIG. 6, the blanket 20 is folded in half along the center transverse seam/fold line 30. In FIG. 7, the blanket 20 is folded in half along the new center transverse seam/fold line 30. In FIG. 8, the blanket 20 is folded in half along the new center transverse seam/fold line 30 such that the final folded size of blanket 20 is one section as defined by the transverse seam/fold line 30 and longitudinal seam/fold line 32. It is understood that other folding patterns are contemplated. The blanket 20 may further be formed to a compact size by a combination of folding, rolling and/or stuffing of the blanket.

Figure 11:
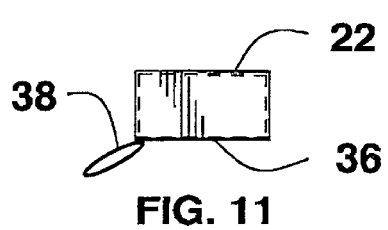
FIG. 11 is a view analogous to FIG. 10, but showing the reversible storage bag slipped completely over the folded blanket with the closure mechanism closed.
Figure 12:
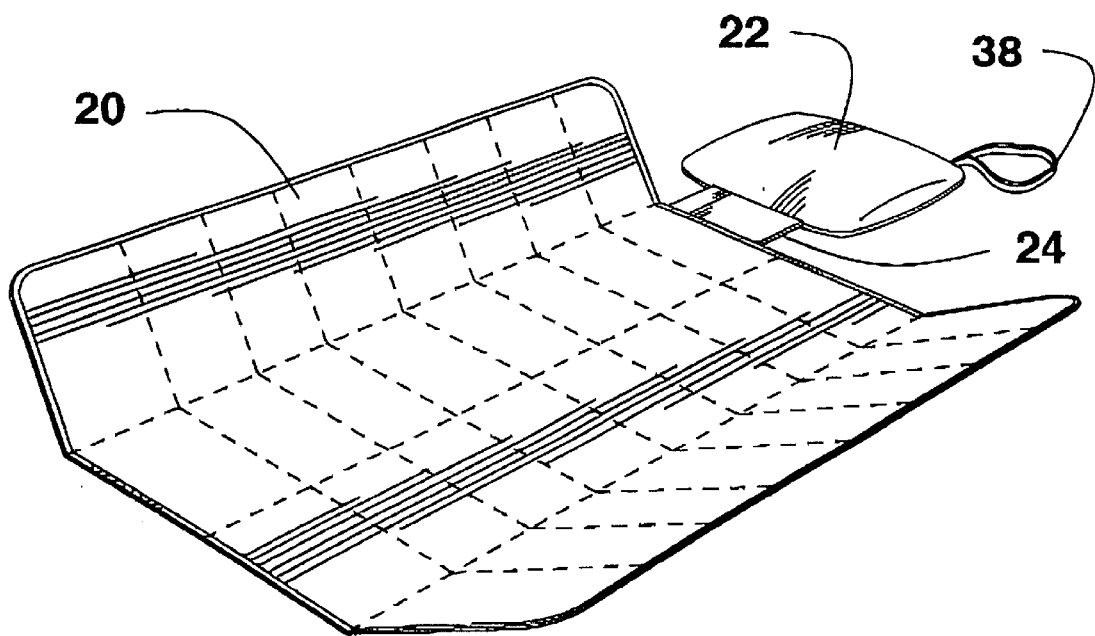
FIG. 12 is a view of the blanket in a substantially unfolded state and showing the attached bag which inverts around the blanket when folded.

In FIG. 9, the reversible storage bag 22 is partially inverted and slid over one longitudinal edge of the folded blanket 20. In FIG. 10, the reversible storage bag 22 is completely inverted such that the folded blanket 20 is captured generally within the reversible storage bag 22. In FIG. 11, the zipper closure mechanism 36 is closed to seal the blanket 20 completely within the reversible storage bag 22. The blanket 20 can generally be folded, rolled or stuffed by any method such that the final dimensions are generally equal to one section of the grid defined by transverse seam/fold line 30 and longitudinal seam/fold line 32, or so that the blanket in the folded, rolled or stuffed form fits within the bag 22. The reversible storage bag 22 is generally defined such that the dimensions accommodate and allow insertions of a folded blanket 20 as described above. The fabric connecting strip 24 is provided to accommodate misalignments during folding variations. FIG. 12 shows fabric connecting strip 24 when extended to allow reversible storage bag 22 to align properly with blanket 20, even in cases when the top transverse edge of the unfolded blanket 20 is not exactly matched to the top transverse edge of the folded blanket 20. It is understood that the bag 22 may be closed by means other than zippers in alternative embodiments. Such alternatives include snap closures, Velcro® strips, button and hole arrangements, overlapping flaps such that a first flap may be folded underneath a second flap to seal the bag, or any other generally accepted means of closing a bag.

Figure 13:
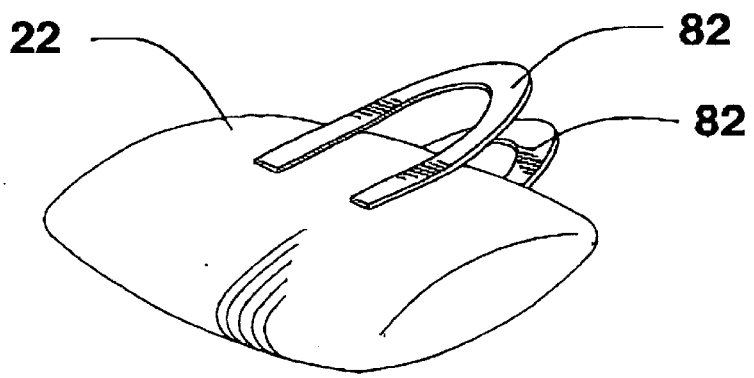
FIG. 13 is a view of the bag and carrying handles with the blanket folded therein.
Figure 14:
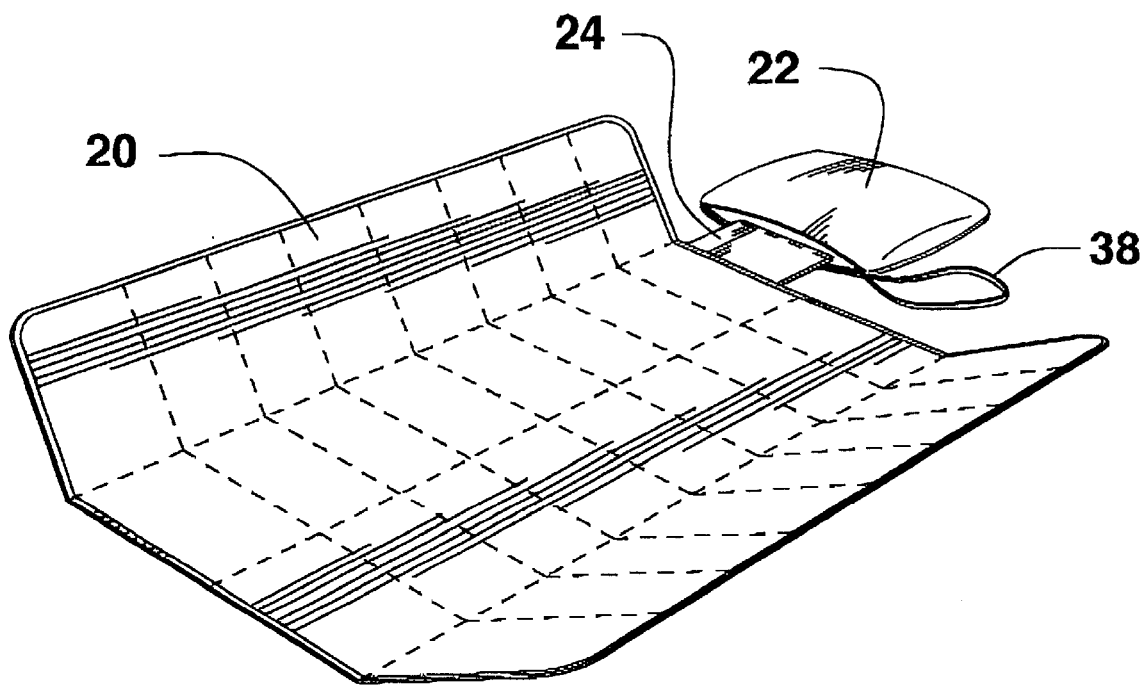
FIG. 14 is an alternative embodiment of the invention shown in FIG. 12 where the bag does not invert when the blanket is stored therein.

The bag 22 has been described thus far as being reversible. Thus, in FIG. 12, after folding, rolling or stuffing of the blanket 20 to a compact footprint as described above, the bag 22 would be inverted from the position shown in FIG. 12 around the blanket and closed as shown in FIG. 13. However, in an alternative embodiment shown in FIG. 14, the bag 22 need not be reversible. In such an embodiment, after folding, rolling or stuffing of the blanket 20 to a compact footprint as described above, the blanket is stored in the bag 22 without inverting the bag. As shown in FIG. 14, the connecting strip 24 is affixed to an interior of the bag to allow the blanket to be stored within the bag without inverting the bag.

Figure 15:
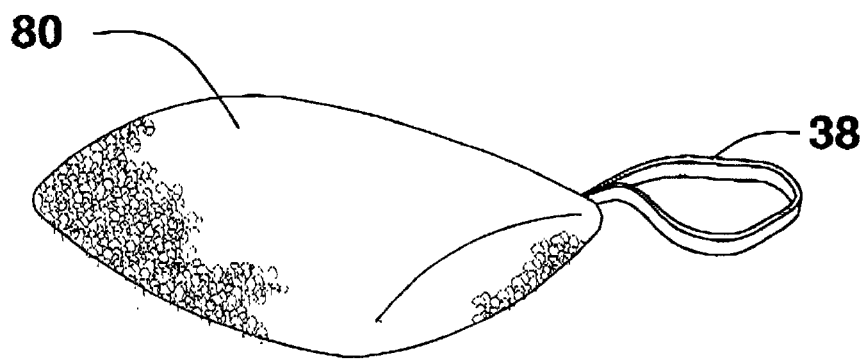
FIG. 15 is a view of the bag according to an embodiment where the bag may be used as a pillow.

It is further understood that the bag 22 may be used as a pillow when the blanket is stored therein or when the blanket is unfolded. In the embodiment of FIG. 12 where the bag inverts, the interior surface of the bag (i.e., the interior surface when not inverted) may include a fleece, plush, padded and/or quilted material to enhance the quality of the bag as a pillow. The exterior surface of the bag may include a waterproof material as described above. Thus, when the bag is inverted as shown in FIG. 15, the fleece, plush, padded and/or quilted material 80 provides a comfortable pillow whether the blanket is stored therein or not. In the embodiment of FIG. 14 where the bag does not invert, the exterior surface may be waterproof and the bag may be used as a pillow with the blanket stored therein. Additionally or alternatively, where the bag does not invert to store the blanket, the interior surface of the bag may include a fleece, plush, padded and/or quilted material 80 as described above to soften the bag as a pillow when not inverted. Moreover, the bag in this embodiment may be inverted when the blanket is not stored therein so that the material 80 is then on an exterior of the bag 22. As a further alternative embodiment, the exterior surface of the bag shown in FIG. 14 may include a fleece, plush, padded and/or quilted material 80 as described above.

Bag 22 or blanket 20 may additionally include one or more storage pockets. Moreover, the interior surface of the bag 22 in FIG. 12, and the exterior surface of the bag in FIG. 14, may include a carrying strap 38 as shown in FIGS. 1, 4–12 and 14–15, or a handle or handles, such as handles 82 as shown in FIG. 13. Alternatively the bag may include one or more shoulder straps, or belt loops to allow hands-free transfer of the bag and blanket.

Although the blanket has been described thus far as rectangular, it is understood that the blanket may have other shapes in alternative embodiments. For example, the entire blanket, or portions thereof, may be rounded. Moreover, one application of the present invention is for use to cover car seats. It is understood that the blanket according to the present invention may be customized to fit the backseat, cabin floor or trunk of various car and truck models.

While certain exemplary embodiments have been described above and shown in the accompanying drawings, it is to be understood that such embodiments are merely illustrative of and are not restrictive to the broad invention, and that this invention not be limited to the specific constructions and arrangements shown and described, since various other modifications may occur to those ordinarily skilled in the art.

What is claimed is:

1. A combination article, adapted to be used as a blanket or waterproof covering, and adapted to be folded along seam lines and stored in an attached reversible storage bag, comprising:

a planar body portion that is machine washable and flexible and has a waterproof top surface and a soft cloth bottom surface, said body being sewn together by longitudinal seams, transverse seams, and sewn edge binding, and said body portion being generally rectangular with a width of generally three to six feet and a length of generally four to seven feet;

a reversible storage bag attached along the top transverse edge which is generally closed on three sides and has a closure mechanism along the fourth open side and which is generally larger than the folded blanket such that the storage bag captures the folded blanket within, which reversible storage bag inverts upon insertion of the article in to said bag and removal of the article from said bag; and a fabric strip which secures the reversible storage bag to the waterproof blanket along the top transverse edge such that the four edges of the reversible storage bag align with the four edges of the folded blanket.

2. The combination article of claim 1 wherein said reversible storage bag and fabric strip are attached along a side longitudinal edge.

3. The combination article of claim 1 wherein said reversible storage bag is attached by means of a tether.

4. The combination article of claim 1 wherein said reversible storage bag is closed by means of a zipper.

5. The combination article of claim 1 wherein said reversible storage bag is closed by means of a folding a first flap underneath a second flap.

6. The combination article of claim 1 wherein said reversible storage bag is closed by means of a hook and loop fastening system.

7. The combination article of claim 1 wherein said reversible storage bag is closed by means of a snap closure.

8. The combination article of claim 1 wherein the blanket portion can be folded in an arbitrary manner into longitudinal seam/fold line substantially equal portions wherein when folded the reversible storage bag will be located such that the folded blanket can be stored within.

9. The combination article of claim 1 wherein surfaces of said blanket are affixed, and edge finish is created, by means of heat and pressure.

10. The combination article of claim 1 further including at least one storage pocket.

11. The combination article of claim 1 wherein said reversible bag has carrying handles.

12. An article, comprising:

a first sheet pliant of plush material, said first sheet being generally flat and capable of being compacted into a smaller footprint by at least one of folding, rolling and stuffing of said first sheet;

a second pliant sheet of waterproof material, said second sheet being generally flat and capable of being compacted into a smaller footprint by at least one of folding, rolling and stuffing of said first sheet, said first sheet being affixed in substantially overlapping relation to said second sheet;

a bag affixed to at least one of said first and second sheets, said first and second sheets capable of being stored within said bag when occupying said smaller footprint, said bag inverting upon removal of said first and second sheets from said bag and upon insertion of said first and second sheets into said bag;

wherein said first and second sheets together form at least one of a blanket, a cover and a mat.

13. An article as recited in claim 12, wherein said article is machine-washable.

14. An article as recited in claim 12, wherein said bag also functions as a pillow.

15. An article as recited in claim 14, wherein said bag functions as a pillow when said first and second sheets are stored therein.

16. An article as recited in claim 12, wherein said first and second sheets are stored in said bag by inverting said bag around said first and second sheets.

17. An article as recited in claim 16, wherein an exterior surface of said bag prior to inversion includes a waterproof material.

18. An article as recited in claim 17, wherein an interior surface of said bag prior to inversion includes material to enhance use of said bag as a pillow.

19. An article as recited in claim 12, wherein said first and second sheets are stored in said bag without inverting said bag.

20. An article as recited in claim 12, wherein said article has a shape customized to fit in one of a seat, cabin floor and trunk of a vehicle.

21. An article, comprising:
    a pliant sheet, including:
    a first surface including a plush material;
    a second surface including a waterproof material;
    a bag affixed to said sheet;
        said sheet having a first configuration where said sheet is substantially planar so as to form at least one of a blanket, a cover and a mat, and said sheet having a second configuration where said sheet is compacted into a smaller footprint by at least one of folding, rolling and stuffing so as to fit within said bag; and
    a connector between said bag and said sheet, said connector inverting said bag when said sheet is in an uncompacted state.

22. An article as recited in claim 21, wherein said article is machine-washable.

23. An article as recited in claim 21, wherein said bag also functions as a pillow.

24. An article as recited in claim 23, wherein said bag functions as a pillow when said sheet is stored therein.

25. An article as recited in claim 21, wherein said sheet is stored in said bag by inverting said bag around said sheet.

26. An article as recited in claim 25, wherein an exterior surface of said bag prior to inversion includes a waterproof material.

27. An article as recited in claim 26, wherein an interior surface of said bag prior to inversion includes material to enhance use of said bag as a pillow.

28. An article as recited in claim 21, wherein said sheet is stored in said bag without inverting said bag.

29. An article as recited in claim 21, wherein said sheet has a shape customized to fit in one of a seat, cabin floor and trunk of a vehicle.

* * * * *